United States Patent [19]
Stump

[11] 4,201,142
[45] May 6, 1980

[54] AMMONIA APPLICATOR BLADE

[75] Inventor: Lee K. Stump, Belleville, Kans.

[73] Assignee: Ausherman Manufacturing Co., Inc., Belleville, Kans.

[21] Appl. No.: 925,209

[22] Filed: Jul. 17, 1978

[51] Int. Cl.² ............................................. A01C 23/02
[52] U.S. Cl. ........................................ 111/7; 172/699; 172/719
[58] Field of Search ............... 111/7, 86, 1; 172/747, 172/762, 699, 700, 719, 724, 730

[56] References Cited

U.S. PATENT DOCUMENTS

| | | | |
|---|---|---|---|
| 2,924,187 | 2/1960 | Zimmerman | 111/7 |
| 3,970,445 | 7/1976 | Gale et al. | 172/747 X |
| 4,033,271 | 7/1977 | Williams et al. | 111/7 |
| 4,132,181 | 1/1979 | Smith et al. | 111/7 |

Primary Examiner—Edgar S. Burr
Assistant Examiner—James R. Feyrer
Attorney, Agent, or Firm—Robert E. Breidenthal

[57] ABSTRACT

A point for welded removable attachment to a mild steel blade shank and tube to constitute an ammonia applicator blade, such point being cast of high chrome iron to be extremely wear resistant. The point tapers forwardly in width and its generally horizontal bottom slopes downwardly in its forward portion so that outwardly projecting lips along its lower edges not only laterally open and break up soil for swifter ammonia absorption but also tend to pull the blade down into the soil. The point has a V-shaped opening for accommodating the blade shank to which it is butt welded.

6 Claims, 7 Drawing Figures

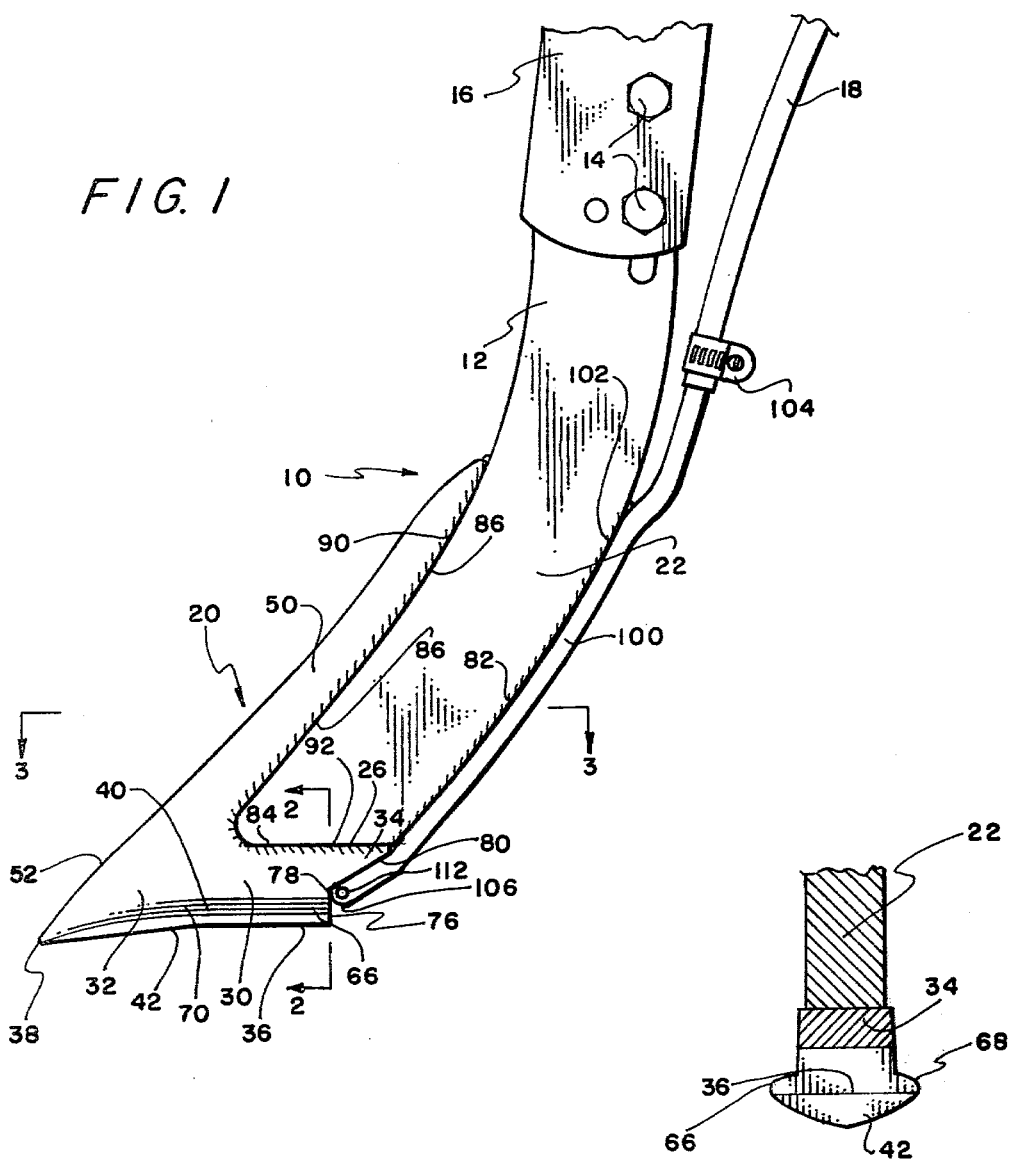
FIG. 1
FIG. 2
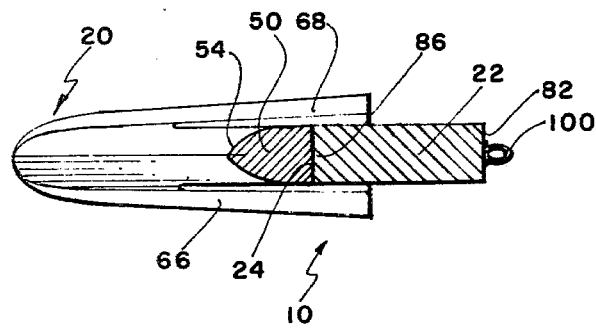
FIG. 3

AMMONIA APPLICATOR BLADE

The present invention relates to new and useful improvements in liquid ammonia injection or applicator blades, and more particularly pertains to a blade of such type having an improved configuration or external shape in its lowermost extent to reduce blade drag and to enhance the intimacy of the soil and ammonia contact, and wherein such lowermost extent of the blade is of a relatively long wearing material which can be removed from and replaced on the shank portion of the blade when eventually necessitated by wear.

A background application of the character of and use of ammonia applicator blades can be readily obtained on reference to U.S. Pats. No. 4,033,271 entitled Apparatus for subsoil Application, which issued to Williams et al. on July 5, 1977; No. 2,904,119 entitled Earth Working Tool Mounting Means, which issued to Hunter on Sept. 15, 1959; No. 3,259,087 entitled Fertilizer Applicator Blade, which issued to Horton on July 5, 1966; and, No. 2,924,187 entitled Subsoil Applicator, which issued to Zimmerman on Feb. 9, 1960.

An important object of the invention is to provide an applicator blade having a great resistance to wear and in which only the worn portion need be replaced when eventually necessitated by wear.

Another important object is, in accordance with the preceding object, to provide a point of a very hard and tough material that can be readily fixed to and removed from a blade shank by the use of conventional welding equipment and skills so that a shank and injection tube can be used indefinitely.

Still another important object is to provide a point in accordance with the preceeding objects such that the same is easily brought into coacting relation with the tube by an inexpensive and simple configuration of the heel portion of the point.

A final and especially important object is to provide a point in accordance with the preceding objects which will, during passage through the soil, pull the blade into the ground and also progressively widen the ground opening to a maximum extent at a position below the depth at which the ammonia is injected.

A broad aspect of the invention involves a point for use in ammonia applicator blades, said point comprising a unitary body cast from an alloy and having a minimum hardness of about 500 BHN, said body having a medial vertical plane of symmetry and comprising a substantially horizontally extending foot having toe and heel portions at its forward and rear ends respectively and a shin joined to the toe portion and extending upwardly and rearwardly therefrom, said foot and the toe portion thereof having a bottom surface that is, throughout substantially their longitudinal extent, generally horizontal in both vertical transverse and longitudinal sections, said foot and the toe portion thereof having lateral sides with surfaces that, throughout substantially their longitudinal extent, have a vertical transverse section that extend downwardly substantially vertically for a major proportion of their height and thence are in their lowermost extents offset outwardly for a vertical interval to define outwardly projecting lips extending along the lower side edges of the foot and its toe portion, with the side surfaces including their lowermost extents being rearwardly divergent in an arrangement such that the outward projection of the lips progressively increases rearwardly along the foot and its toe portion, said shin and its juncture with the toe portion being contoured to present in vertical profile a reclining V-shaped configuration and to present in horizontal section throughout their heights a generally ogive forward configuration, said heel portion being notched to define a rear surface for the foot that extends upwardly substantially vertically from the bottom surface of the foot to a position above the lips of the latter, and which thence extends upwardly and rearwardly to the top of the foot in approximate parallelism with the shin, and said shin having a rear surface and the foot having a top surface that jointly define an opening of a generally reclining V-shape adapted to receive a blade shank therein.

A somewhat more limited aspect of the invention involves an ammonia applicator blade, said blade having a vertical medial plane of symmetry and comprising a forwardly and downwardly inclined shank having a horizontal section that is at least twice as great in forward and rear extent than it is in transverse extent, said shank having a front surface, the lowermost part of which constitutes a shin, said shank also having a lowermost foot portion, such foot portion having a bottom surface that jointly defines with the shin a toe portion of the blade having a transverse vertical profile of a reclining V-shape, said shin and the toe portion having forward extremities that are bluntly sharpened in the horizontal plane, said shank having generally vertical side surfaces adjoining the foot and the toe portions of the blade, a pair of outwardly projecting lips on the side surfaces of the foot portion along the juncture of such surfaces with the bottom wall of the foot portion, said sides and the outermost extent of the lips progressively diverging rearwardly along the extent of the bottom surface, an ammonia injection tube fixed to the rear of the shank and having its lowermost and discharge end disposed rearwardly of the foot portion of the blade, said bottom surface and said lips being forwardly and downwardly inclined forwardly of an intermediate position spaced intermediate the forward and rear extent of the lips, with the bottom surface and said lips being substantially horizontal rearwardly of the intermediate positions.

Other features, objects and aspects of the invention of importance will become manifest in the light of the following description of a preferred embodiment of the invention given in conjunction with the accompanying drawings illustrative thereof, wherein:

FIG. 1 is a side elevational view of an ammonia applicator blade according to the invention;

FIG. 2 is an enlarged fragmentary sectional view taken upon the plane of the transverse vertical sectional line 2—2 in FIG. 1;

FIG. 3 is a horizontal sectional view taken on the plane of the section line 3—3 in FIG. 1;

Figure 6:
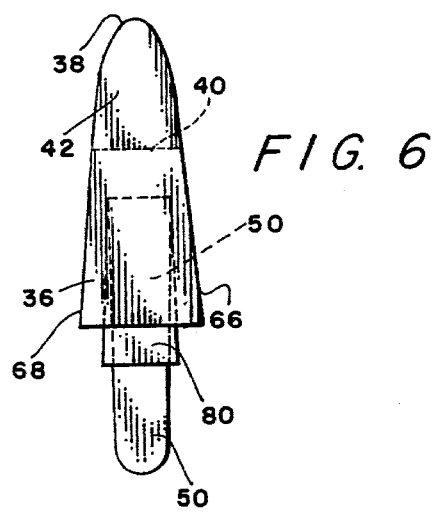
FIG. 6 is a bottom view of the point shown in FIGS. 4 and 5 with hidden details being shown in dashed outline; and, FIG. 7 is an enlarged vertical sectional detail view of the lower end portion of the injector tube.

Referring now to the drawings, wherein like numerals designate like parts throughout the various views, the reference numeral 10 designating the improved ammonia applicator blade generally. The blade 10 includes a blade shank 12 which may conveniently be of a mild steel such as AISI Spec. No. 1040. The upper end portion of the shank 12 is adjustably mounted by conventional means inclusive of threaded fasteners 14 to a partially shown conventional mounting bracket 16 carried by an agricultural implement, not shown.

As will be readily understood by those skilled in the art, such an agricultural implement includes a traction vehicle and means for supplying under a controlled pressure or rate liquid ammonia through a flexible supply tube such as that partially shown at 18.

The blade 12 additionally comprises a point designated generally at 20 that is mounted upon the forwardly and downwardly inclined lower extent 22 of the shank 12.

The shank 12 is substantially rectangular in transverse section throughout its extent and the lowermost inclined portion 22 can be straight or essentially so as in the slightly arcuate form thereof shown in FIG. 1.

The point 20, as will be explained in detail subsequently, is removably and replaceably attached to the forward and bottom flat surfaces 24 and 26 of the lower shank portion 22.

The point 20 is of a material that is weldable to and much harder than the shank portion 22, with such material being preferably such as to be castable into its desired shape having its desired hardness and necessary toughness. It has been found that a point 20 of excellent characteristics can be cast from a high chrome iron. The alloy is selected such as to produce on casting a minimum hardness of about 500 BHN. Substantially less hardness may result in undue wear rate. Greater hardness can be used though hardness so great as to result in excessive brittleness should be avoided. Prolonged tests in the described preferred material have shown great resistance to wear and that the point 20 in usage acquires a polished and mirror like appearance of low drag character.

The point 20 and the shank portion 22 share a common medial vertical plane of symmetry and the point 20 is constituted of a unitary body comprised of a horizontally extending foot 30 including toe and heel portions 32 and 34 respectively at its forward and rear ends.

The foot 30, inclusive of the toe portion 32 thereof, has a lower or bottom surface 36 that extends rearwardly from the forward tip 38 of the point 20 to the heel portion 34 of the foot 30, such bottom surface 36 being preferably, as shown, substantially horizontal or flat in transverse section throughout its longitudinal extent, though if deemed necessary or expedient, such transverse configurations can be a shallow V-shape or present a downwardly arcuate shape, not shown.

From an intermediate position intermediate the tip 38 and the heel portion 34 indicated by dashed line 40 in FIG. 6, the bottom surface 36 extends horizontally rearwardly, and forwardly of such intermediate position 40, the bottom surface 36 is inclined forwardly and downwardly as indicated at 42. The angle of downward inclination of the bottom surface portion 42 should be between about 5 to about 10 degrees.

The point also includes as a part of its unitary structure a shin 50 joined to and extending upwardly and rearwardly from the toe portion 32 of the foot 30. The forward edge 52 of the shin and the bottom surface portion 42 jointly define in vertical profile a generally reclined V-shape configuration with an apex angle preferably in the range of about 30 to about 50 degrees, with about 40 degrees being preferred.

Figure 4:
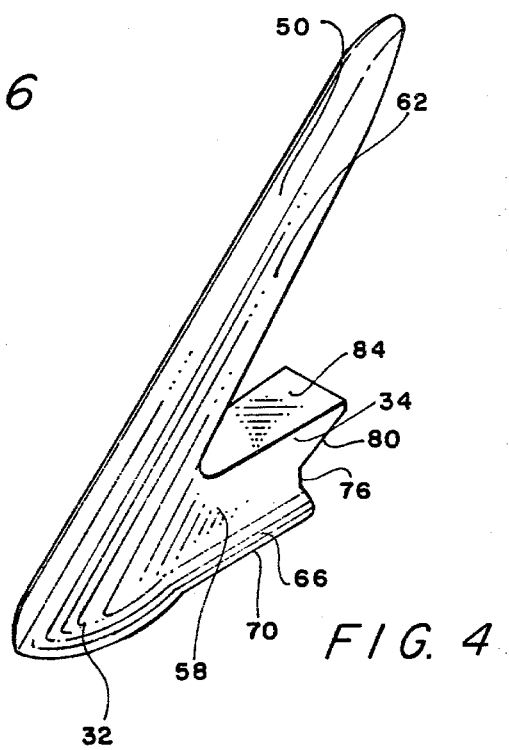
FIG. 4 is an isometric view of the point as the same appears detached from the blade shank.
Figure 5:
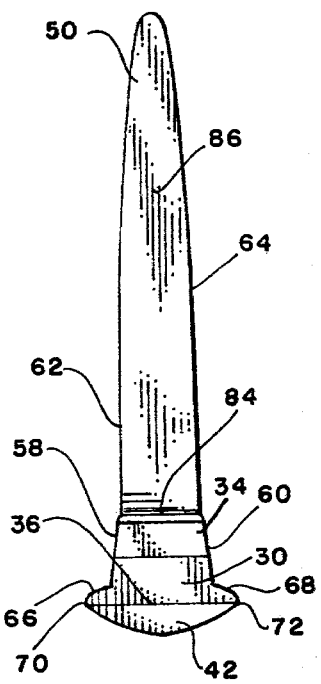
FIG. 5 is a rear elevational view of the point shown in FIG. 4.

The forward edge 52 of the shin 50 is bluntly sharpened, preferably in the form of the ogive located at 54 in FIG. 3 so as to reduce drag during movement through the soil while not unduly weakening the same. Such ogive 54 is continued through the vertical extent of the shin 50 as well as through the region of the juncture with the toe portion 32, that is, the bluntly sharpened configuration is preferably continued to the tip 38. The foot 30 inclusive of its toe portion has opposite side surfaces 58 and 60 which smoothly merge at their forward ends with the sides 62 and 64 of the shin 50. As best shown in FIGS. 4 and 5, the lowermost extents of the side surfaces 58 and 60 are outwardly flared to define outwardly projecting lips 66 and 68 that extend along the junctures of the side surfaces 58 and 60 with the bottom surface 36 including the forwardly and downwardly inclined portion 42 of the latter.

The side surfaces 58 and 60 as well as the lips 66 and 68 constituting the lower portions of the latter are progressively rearwardly divergent. Not only do the side surfaces 58 and 60 diverge rearwardly as shown, the outward projection of the lips also progressively increases rearwardly, that is, for example, the outward projection of the lip 66 from the relatively vertical side surface 68 increases progressively rearwardly.

It is to be particularly noted that inasmuch as the lips 66 and 68 extend along the opposite edges of the bottom surface 36, such lips also partake in the forward and downwardly inclination of the forward portion 42 of the bottom surface 36. Thus, while the rearmost portion of the lips 66 and 68 extend rearwardly in a substantial horizontal plane, the forward portions thereof such as the portion 70 of the lip 66 is inclined forwardly and downwardly. It will be evident on inspection of FIGS. 2 and 5 that the lips 66 and 68 have a vertical height constituting a minor proportion of the vertical height of the foot 30, preferably less than about one-third of such height. It will also be seen that the downward flaring of the side surfaces 58 and 60 to define the lips 66 and 68 preferably entail departures from the vertical of about 45 degrees so that the lips 66 and 68 taper downwardly in their vertical extent outwardly from their respective surfaces 58 and 60 to terminate in blunt extremities 70 and 72.

The heel portion 34 of the heel 30 is notched or shaped so as to provide a vertical rear surface 76 extending upwardly from the bottom surface 36 to a position 78 disposed above the lips 66 and 68, such surface thereafter extending upwardly and rearwardly as indicated at 80 to the top of the foot 30. As will be seen presently, the trailing surface 76 affords a space that is both below and rearwardly thereof for accommodating the discharge end of an injector tube. The inclination of the surface 80 is preferably parallel to the extent of the shin 50 and approximates a downward continuation of the rear edge 82 of the shank 22 when the components are assembled as shown in FIG. 1. The upper surface 84 of the foot 30 and the rear surface 86 of the shin 50 are both flat and are jointly of a V-shape configuration adapted for the flush seating thereagainst of the corresponding surfaces 26 and 24 of the shank portion 22. It will be noted on inspection of FIG. 3 that the transverse thickness of the shank portion 22 corresponds approximately to that of the shin 50 so that such members can be conveniently butt welded together as indicated at 90 in FIG. 1. Such line of butt welding is extended along the juncture of the surfaces 26 and 84 as indicated at 92.

The character of the mating shapes of the shank 22 and the point 20 is such that when the point 20 has worn to such an extent necessitating replacement, the point 20 can be easily removed from the shank 22 by use of a cutting torch in a manner nondestructive of the latter.

Figure 7:
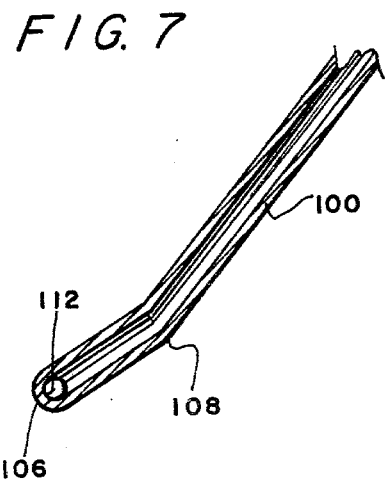

A metallic liquid ammonia injection tube 100 is welded as at 102 to extend along the rearmost side 82 of the shank portion 22 as best shown in FIGS. 1 and 3. In use, the upper end of the tube 100 is coupled to the hose 18 by means of a hose clamp 104. The tube 100 projects downwardly below the lower end of the shank portion 22 and has a closed lower end 106 disposed directly rearwardly of the vertical rear surface 76 below the inclined wall portion 80, and at a height above that of the lips 66 and 68. In the preferred construction, the tube 100 is bent at 108 as shown in FIGS. 1 and 7 so that the closed end 106 is tucked in, so to speak, closely adjacent the juncture of the surfaces 76 and 80. It will be noted that installation on or removal of a point 20 from a shank 22 does not require disturbing the tube 100 nor does the presence of the latter make such assembly or disassembly substantially more difficult. If desired or deemed expedient, the tube 100 can be of stiff material sufficiently deformable to enable varying the degree of the bend 108 therein prior to or after installing a point 20.

The use of the blade 10 will be readily understood, particularly as the interchangeability of points 20 infrequently necessitated by wear has already been explained.

The forward or leading ogive configuration contributes to durability as well as to easier movement through the ground, while the rearwardly diverging side surfaces 58 and 60 and lips 66 and 68 serve to open and pulverize the soil in the gas release space, thus exposing a substantial area of pulverized soil particle surface to contact by ammonia discharged from lateral openings 112 adjacent the lower end of the tube 100.

The forward and downwardly inclined extents of the forward portions of the lips coact with the soil to exert a downward force on the blade 10 thereby lessening any need for the implement to supply such a force. The forward and downward inclination of the forward portion 42 of the bottom surface affords a path for ammonia forwardly under the point 20 so that soil contact, absorption and reaction therewith can be initiated at a relatively forward position. Such contact may be substantial when soil conditions are such that the toe portion 32 is trailed by a wake of soil particles lying under the horizontal portion of the bottom surface 36.

Inasmuch as the portions of the lips 66 and 68 rearwardly of the intermediate position 40, which are of the greatest lateral extent, are substantially horizontal in the direction of travel of the blade 10, they tend to stabilize the vertical depth of blade 10 penetration while extending the cross section of the soil opened or exposed to contact by the ammonia. In this regard it will be noted that the lips 66 and 68 result in a transverse dimension for the point 20 that is between about 40 to about 50% greater than that of the side surfaces 58 and 60 above the lips, with about 46% being particularly preferred.

It has been found in actual use that the described blade 10 inclusive of the point 20 is very rugged and wear resistant, and can be employed at a speed of advance at least as high as is customary with a correspondingly high rate of ammonia injection without excessive drag on the implement and without appreciable or objectionably high loss of ammonia.

Attention is now directed to the appended claims.

I claim:

1. A point for use in ammonia applicator blades, said point comprising a unitary metallic body having a minimum hardness of about 500 BHN, said body having a medial vertical plane of symmetry and comprising a substantially horizontally extending foot having toe and heel portions at its forward and rear ends respectively and a shin joined to the toe portion and extending upwardly and rearwardly therefrom, said foot and toe portion thereof having a bottom surface that is, throughout substantially their longitudinal extent, generally horizontal in both vertical transverse and longitudinal sections, said foot and the toe portion thereof having lateral sides with side surfaces that, throughout substantially their longitudinal extent, have a vertical transverse section that extend downwardly substantially vertically for a major proportion of their height and thence are in their lowermost extents offset outwardly for a vertical interval to define outwardly projecting lips extending along the lower side edges of the foot and its toe portion, with the lateral sides, including their lowermost extents, being rearwardly divergent in an arrangement such that the outward projection of the lips progressively increases rearwardly along the foot and its toe portion, said shin and its juncture with the toe portion being contoured to present in vertical profile a reclining V-shaped configuration and to present in horizontal section substantially throughout their heights a generally ogive forward configuration, said heel portion being notched to define a rear surface for the foot that extends upwardly substantially vertically from the bottom surface of the foot to a position above the lips of the latter, and which thence extends upwardly and rearwardly to the top of the foot in approximate parallelism with the shin, and said shin having a rear surface and the foot having a top surface that jointly define an opening of a generally reclining V-shape adapted to receive a blade shank therein.

2. The combination of claim 1, wherein each of said vertical transverse sections have a width at the lower extremities of the lateral sides that is at least about 40% greater than that at the upper extremities of said lateral sides.

3. The combination of claim 2, wherein, from an intermediate position spaced intermediate the longitudinal extent of the lips, the longitudinal extent of the bottom surface is inclined forwardly and downwardly between about 5 and about 10 degrees relative to the extent of the bottom surface rearwardly of said intermediate position.

4. The combination of claim 1, wherein the rear and top surfaces of the shin and foot are substantially flat and adapted for butt welding to a blade shank seated therein.

5. The combination of claim 1, together with a forwardly and downwardly inclined blade shank disposed in the plane of symmetry, said blade shank having forward and bottom surfaces conformable to and seated in engagement against said rear and top surfaces of the shin and foot respectively, with said shank and the body being butt welded together in their seated engagement, said shank having a vertically inclined rear surface generally parallel to the shin, and an injector tube fastenee to the rear surface of the shank and having a lower end portion projecting under the heel portion and terminating at a position directly to the rear of the rear surface of the foot.

6. An ammonia applicator point adapted for welded attachment to a shank, said point comprising a unitary metallic body having a minimum hardness of 500 BHN, said body having a vertical medial plane of symmetry and being comprised of an elongated upward and rearwardly extending portion constituting a shin having a lower end, and a foot portion joined integrally with the lower end of the shin and extending substantially horizontally rearwardly therefrom, whereby the point has a reclining V-shaped profile, said shin and said foot portion respectively having rear and upper surfaces defining an acute dihedral angle adapted to receive a shank therein for welded attachment thereto, said juncture of the shin and the foot portion defining a toe portion of the body, said shin and the toe portion having a forwardly facing surface that is bluntly sharpened in the horizontal plane, said toe and foot portions of the body having generally vertical opposite side surfaces, said foot portion having a bottom surface, a pair of outwardly projecting lips at the junctures of the bottom surface with the opposite side surfaces, said opposite side surfaces and the outermost extents of the lips progressively diverging rearwardly along the bottom wall, said bottom surface as well as said lips being forwardly and downwardly inclined forwardly of a position intermediate the medial extent of the bottom surface, with said bottom surface as well as said lips being substantially horizontal rearwardly of said position, said foot portion and said lips having a rearmost extremity defined by a trailing surface that extends substantially vertically from the bottom surface to a location intermediate the bottom surface and the upper surface of the foot portion, with such location being above said lips, said trailing surface thence extending from said location upwardly and rearwardly to said upper foot surface in approximate parallelism with the shin, the arrangement being such that space that is both below and to the rear of the trailing surface is adapted to accommodate a discharge end of an injection tube carried by a shank.

* * * * *